United States Patent
Ishikawa et al.

(10) Patent No.: US 6,218,960 B1
(45) Date of Patent: Apr. 17, 2001

(54) REAR-VIEW MONITOR FOR USE IN VEHICLES

(75) Inventors: Naoto Ishikawa; Kazutomo Fujinami; Keiki Okamoto, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/515,527

(22) Filed: Feb. 29, 2000

(30) Foreign Application Priority Data

Mar. 1, 1999 (JP) .................................................. 11-052437

(51) Int. Cl.$^7$ ...................................................... G08G 1/00
(52) U.S. Cl. ........................... 340/901; 340/435; 340/903; 340/937; 348/118; 348/148; 348/149; 382/104; 701/1
(58) Field of Search ...................................... 340/301, 435, 340/436, 903, 905, 937, 933; 348/118, 148, 149, 113, 119; 382/104; 701/1, 301, 28

(56) References Cited

U.S. PATENT DOCUMENTS

| | | | |
|---|---|---|---|
| 4,277,804 | * | 7/1981 | Robison ................................ 358/108 |
| 5,121,200 | * | 6/1992 | Choi ..................................... 358/103 |
| 5,289,321 | * | 2/1994 | Secor ................................... 358/149 |
| 5,521,633 | * | 5/1996 | Nkakjima et al. ................... 348/118 |
| 5,680,123 | * | 10/1997 | Lee ...................................... 340/937 |
| 5,699,057 | * | 12/1997 | Ikeda et al. .......................... 340/937 |
| 5,793,308 | * | 8/1998 | Rosinski et al. ..................... 340/903 |
| 6,057,754 | * | 5/2000 | Kinoshita et al. ................... 340/435 |

FOREIGN PATENT DOCUMENTS

| | | |
|---|---|---|
| 6-107096 | 4/1994 | (JP) . |
| 7-50769 | 2/1995 | (JP) . |
| 2641562 | 5/1997 | (JP) . |

\* cited by examiner

Primary Examiner—Nina Tong
(74) Attorney, Agent, or Firm—Armstrong, Westerman, Hattori, McLeland & Naughton, LLP

(57) ABSTRACT

A rear-view monitor for use in vehicles is provided, in which contained are vehicle-mounted image pickup means for picking up images of road in the rear of one's own vehicle at every fixed time; and detection means for detecting an overtaking vehicle by processing road images obtained by the image pickup means. The monitor keeps monitoring of relative movement between one's own vehicle and the overtaking vehicle detected by the detection means. The monitor is characterized in that the image pickup means contain a wide-angle high resolution camera, and the detection means include: first image processing means for processing the whole road images obtained by the image pickup means by sampling image data; second image processing means for processing a part of road images obtained by the image pickup means without sampling image data; and selection means for selecting either the first image processing means or the second image processing means in response to a situation of traffic. Thus, a rear-view monitor for use in vehicles according to the present invention enables monitoring over a wide range, i.e. the far and near distances, under preferable conditions.

3 Claims, 6 Drawing Sheets

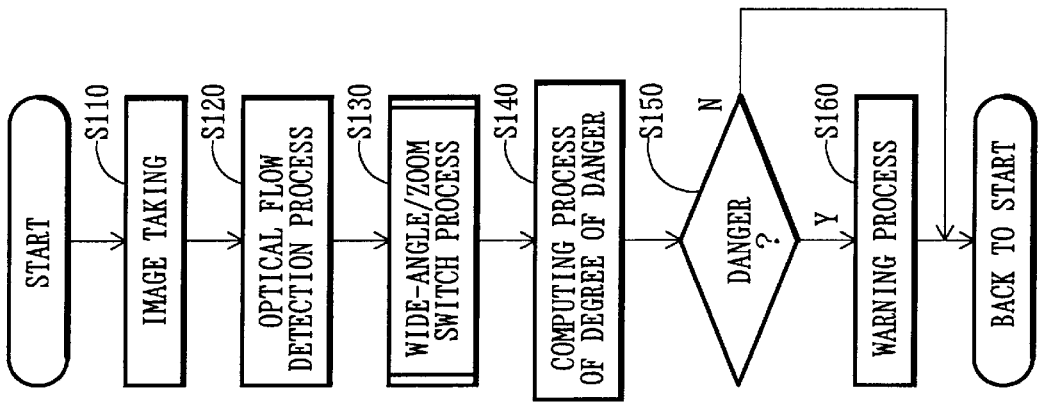
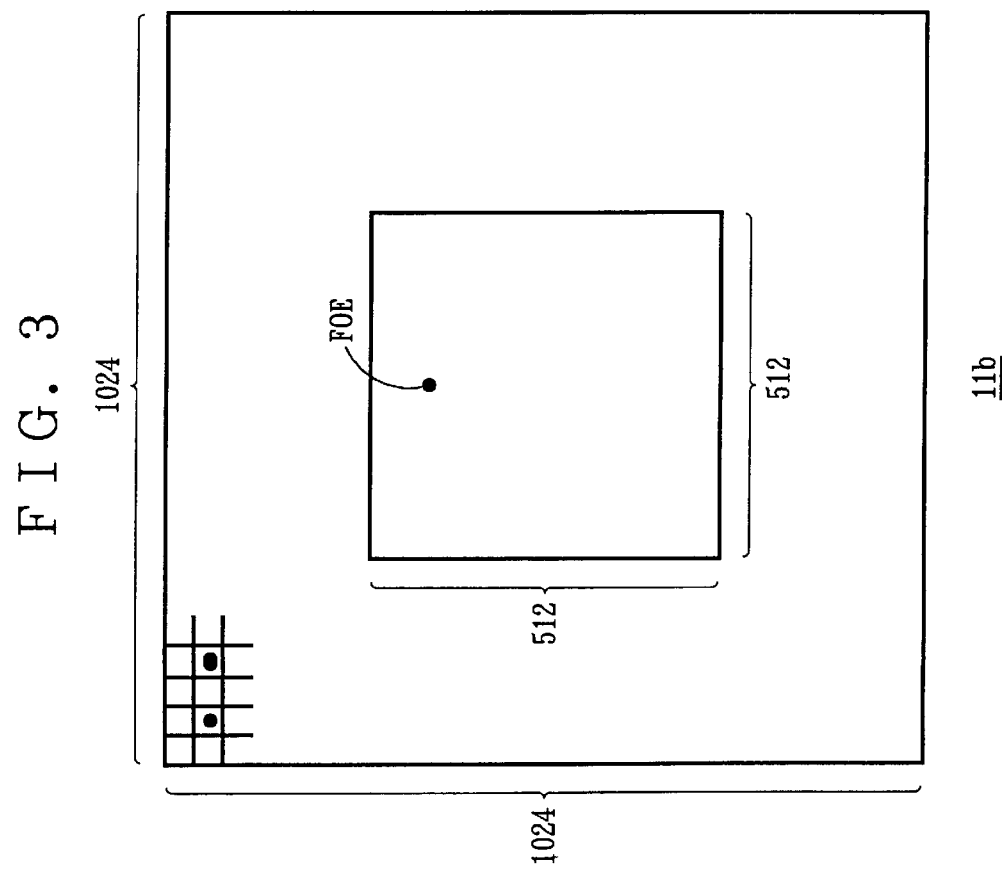

REAR-VIEW MONITOR FOR USE IN VEHICLES

BACKGROUND OF THE INVENTION

(1) Field of the Invention

This invention relates to a rear-view monitor for use in vehicles and, more specifically, to a rear-view monitor that warns a driver to respond to an vehicle approaching from the rear with regard to one's own vehicle by taking images of road in the rear of one's own vehicle with an image pickup device such as a video camera mounted on one's own vehicle such as a motor vehicle and then, by detecting a vehicle approaching from the rear using road images thus obtained.

(2) Description of the Related Art

Several rear-view monitoring and warning systems have hitherto been proposed in the past, for example, Japanese Patent Publication No. 2641562, Japanese Patent Application Laid-Open No. H6-107096 and H7-50769. The systems are capable of monitoring the rear road in order to prevent a possible collision with an overtaking vehicle from occuring by correctly sizing a situation of the overtaking vehicle traveling an adjacent either right or left traffic lane and then, warning a driver of possibility of collision with such overtaking vehicle traveling the adjacent lane when a driver is about to chang the traveling lane.

According to the proposed systems, in order to detect an overtaking vehicle traveling the adjacent lane quickly and securely without performing an excessive image processing, lanes on the road are distinguished by recognizing white lines, i.e. lane dividing lines, using road images taken by a video camera, and a monitoring range is set to the adjacent lane in accordance with this discrimination so that an amount of image processing for detecting an approaching vehicle within an adjacent lane, i.e. a monitoring range set up in the road images taken by a video camera, is reduced.

Apparatuses that employ a detection system by optical flow are disclosed in Japanese Patent Application Laid-Open No. H6-107096 and H7-50769, features of which are explained with reference to FIGS. 7 and 8 in the following.

FIG. 7 is a block diagram illustrating an assembly of a conventional rear-view monitoring and warning system for vehicles, which contains an image pickup unit 10 as an image pickup device such as a video camera 11, a data processing unit 30 as a computing system, and a speaker 42 as a warning means.

The image pickup unit 10 is mounted at the rear side of a vehicle such as on a trunk lid so as to take road images of the rear with regard to the traveling vehicle. The data processing unit 30 contains a CPU 31 as a central processing unit operating in accordance with an operation program, a ROM 32 for memorizing the operation program of the CPU 31 and predetermined settings, and a RAM 33 for provisionally memorizing data required upon computation by the CPU 31. The speaker 42 mounted on the vehicle warns a driver of a danger by sounding or warning in accordance with a signal from the CPU 31 in the data processing unit 30.

FIGS. 8A and 8B illustrate a change in images taken by the image pickup unit 10 mounted at the rear portion of the vehicle. FIG. 8A is an image taken at a time t and FIG. 8B at a time t+Δt. In each figure, shown are an overtaking vehicle 200 traveling in the rear with regard to one's own vehicle, a traffic sign 300 disposed along a road 500, and a building 400 along the road 500.

Supposing that one's own vehicle is traveling straight along a flat road, with time passing by, i.e. accompanied by the vehicle traveling, the traffic sign 300 and building 400 are relatively leaving from the vehicle, resulting in that the images of the traffic sign 300 and building 400 become small. That is, in the figures, images of the traffic sign 300 and building 400 taken at the time t shown in FIG. 8A is smaller than those taken at the time t+Δt shown in FIG. 8B.

In the following, the optical flows are explained with reference to these figures.

In these figures, to be considered are a plurality of marked points selected in the images taken at the time t (see FIG. 8A) such as: marked points 201a and 202a for the overtaking vehicle 200; 301a, 302a and 303a for the traffic sign 300; and 401a and 402a for the building 400. Similarly, to be considered are marked points such as: 201b and 202b for the overtaking vehicle 200; 301b, 302b and 303b for the traffic sign 300; and 401b and 402b for the building 400 in the images taken at the time t+Δt (see FIG. 8B). Then, each combination between corresponding marked points, for example 201a and 201b, gives a velocity vector such as 201F, 202F, 301F, 302F, 303F, 401F and 402F as shown in 8C. These velocity vectors are defined as the optical flows.

Here, it can be understood that the optical flow radially appears from a focus of expansion (hereinafter, FOE) defined as an infinitely far point or a vanishing point in the figures. When one's own vehicle is traveling straight, the FOE corresponds to just the opposite direction to which the vehicle is traveling.

When one's own vehicle is traveling, an optical flow of an object going away from the vehicle is a convergent vector heading toward the FOE, while an optical flow of an object approaching the vehicle is a divergent vector away from the FOE. Accordingly, the optical flows 201F and 202F (shown in FIG. 8C) are divergent vectors, indicating that the vehicle 200 is approaching one's own vehicle, in other wards, that the vehicle 200 is traveling faster than one's own vehicle.

Regarding a size of the optical flow, the size is large when a difference in velocity between one's own vehicle and an object is large and also when a distance therebetween is short. In the following, this matter is explained with reference to the attached drawings.

FIG. 9 illustrates an optical arrangement of the image pickup unit 10, in which 11a is a lens of the video camera in the image pickup unit 10, 11b is an image plane of the video camera, f is a distance between the lens 11a and the image plane 11b, P ($X_a$, $Y_a$, $Z_a$) is an arbitrary point of the overtaking vehicle, and p ($Xa$, $ya$) is a point corresponding to the point P on the image plane 11b.

On this occasion, the following formula is given on the basis of similar figures in triangles:

$$X_a = f \cdot X_a / Z_a \quad (1)$$

Transforming the formula (1) and then, differentiating with respect to time gives the following formula (2):

$$X_a' = (\Delta x_a / \Delta t \cdot Z_a + x_a \cdot Z_a') / f \quad (2)$$

A x-component u of an optical flow is given by the following formula (3):

$$u = \Delta x_a / \Delta t \quad (3)$$

Hence, the following formula (4) is derived from the formula (3):

$$Z_a = (f \cdot X_a' - x_a \cdot Z_a') / u \quad (4)$$

Here, $Z_a'$ denotes a difference in velocity between the overtaking vehicle (200 in FIG. 8) traveling the same lane or the adjacent lane and one's own vehicle on which the image pickup unit 10 is mounted. Assuming this difference in velocity to be $-\alpha$, the formula (4) is expressed by the following formula (5):

$$Z_a = (f \cdot X_a' + x_a \cdot \alpha)/u \tag{5}$$

Hence, the x-component u of the optical flow, is expressed by the following formula (6):

$$u = (f \cdot X_a' + x_a \cdot \alpha)/Z_a \tag{6}$$

By the way, $Y_a$, i.e. Y-coordinate of the point P, can be derived in the similar way.

Consequently, according to the formula (6), when Z is small, i.e. a distance between one's own vehicle and the overtaking vehicle 200 traveling the same lane or the adjacent lane is short, or when a is large, i.e. the difference in velocity between one's own vehicle and the overtaking vehicle 200 is large, an x-component of the optical flow becomes large. These relations are the same with respect to the Y-direction.

Accordingly, the size of the optical flow becomes large when the distance between one's own vehicle and the overtaking vehicle 200 is short, and when the difference in velocity between the both vehicles is large, resulting in that the direction of the optical flow diverges from the FOE. In this case, the larger the size of the optical flow, the larger a degree of danger of the collision.

The data processing unit 30 recognizes a situation, in which the optical flow is the divergent vector as mentioned above and also the size of the optical flow is large, caused by either or both situations as follows: one situation that the object is in the vicinity of one's own vehicle and another situation that the object is approaching one's own vehicle with higher speed than that of one's own vehicle, and the data processing unit 30 judges that the degree of danger is high. Thus, the data processing unit 30 warns a driver of the danger via the speaker when the unit judges that the degree of danger is high.

By such repeated data processings with respect to all the points on the image taken at the time t, optical flows covering the whole image can be obtained, and each degree of danger corresponding to each object is determined. Then, an attention is given to a driver by warning sounds and the like according to the degree of danger determined, resulting in giving a complement to a limited recognition by a human being and prevention of an actual traffic accident from occurring or being out of dangerous situation which might otherwise develop into a serious accident.

As shown in FIG. 10, in a conventional art, a detection of white lines of a lane, along which one's own vehicle is traveling a straight six-lane expressway, brings about a discrimination between said lane and adjacent lanes and a determination of range to be monitored, aiming such that a processing time for monitoring of unnecessary field of vision can be saved and a high-speed processing can be achieved. An extension of thus detected white lines determines a FOE point and the overtaking vehicle 200 is detected by determining optical flows developed radially from said FOE point regarding a range of one's lane and adjacent lanes. Since a necessary recognition in the system is formed on the basis of the size of the optical flows, a degree of danger regarding the overtaking vehicle 200 traveling the rear or adjacent lanes is automatically judged and advantageously, an extra speedometer is not necessary.

Among currently proposed detection methods of the optical flow, a correlation method is nearly on a level of practical use. The correlation method has a disadvantage of enormous amount of computation since the method contains a search for corresponding points of window (pixel) with respect to all circumferential areas and a computation of correlation values. On the other hand, the method has an advantage of finding relatively correct optical flow regarding a complicated image, for which the present invention has as a subject.

As mentioned above, according to the correlation method, when optical flows are to be found regarding an image at the time t, searchs in all directions are necessary to find out which pixel among all the pixels in an image at the time t corresponds to which pixel in an image at the time $t-\Delta t$, causing enormous amount of computation as well as a possible error in required response. Hence, it is considered that limiting a monitoring range might solve problems such as long precessing time and low detection accuracy.

As for the aforementioned type of rear-view monitoring system for use in vehicles, from an image taken by a video camera, a large image of another vehicle in the vicinity of one's own vehicle can be obtained compared with that far from one's own vehicle, but only a small image of the other vehicle far from one's own vehicle can be obtained. Therefore, an image of low resolution is good enough in the vicinity of one's own vehicle, but a distant image with low resolution makes it difficult to catch a behavior of another vehicle precisely by an image processing and consequently, it is preferable that images with high resolution as much as possible can be obtained regarding distant images.

In addition, taking a case of lane change into consideration, it is preferable to use a wide-angle video camera to monitor adjacent lanes as close as possible to one's own vehicle. However, the use of the wide-angle video camera makes the monitoring range wider, resulting in deterioration in the resolution and increase in number of image data to be processed, causing problems such as long precessing time and low detection accuracy.

Thus, regarding this types of monitoring system, in which monitoring of the far and near distances are simultaneously needed, there are above-mentioned contradictory requirements and therefore, a measure to meet with these requirements has been desirable.

SUMMARY OF THE INVENTION

It is therefore an object of the present invention to solve the above-mentioned problems and to provide a rear-view monitor for use in vehicles, which enables monitoring over a wide range, i.e. the far and near distances, under preferable conditions.

In order to accomplish the above object, referring to a basic assembly shown in FIG. 1A, a first aspect of the present invention is to provide a rear-view monitor for use in vehicles, comprising: vehicle-mounted image pickup means 10 for picking up images of a road in the rear of one's own vehicle at every fixed time; and detection means 31-1 for detecting an overtaking vehicle by processing road images obtained by the image pickup means, wherein relative movement between one's own vehicle and the overtaking vehicle detected by the detection means is monitored, the image pickup means contain a wide-angle high resolution camera, and the detection means include: first image processing means 31-11 for processing the whole road images obtained by the image pickup means by sampling image data; second image processing means 31-12 for processing a part of road images obtained by the image pickup means without sampling image data; and selection means 31-13 for selecting either the first image processing means or the second image processing means in response to a situation of traffic.

In the rear-view monitor for use in vehicles according to the first aspect of the present invention, the detection means 31-1 process the images of road in the rear of one's own vehicle, of which vehicle-mounted image pickup means 10 monitor at every fixed time, to detect an overtaking vehicle and relative movement between the detected overtaking vehicle and one's own vehicle is monitored. The image pickup means contain a wide-angle high resolution camera, and the first image processing means 31-11 process the whole road images obtained by the image pickup means by sampling image data, and the second image processing means 31-12 process a part of road images obtained by the image pickup means without sampling image data, and the selection means 31-13 select either the first image processing means or the second image processing means in response to a situation of traffic.

Therefore, when the selection means select the first image processing means, the whole road images obtained by the image pickup means are processed by sampling image data and wide-range images are processed with low resolution, enabling a wide-range monitoring of other vehicles in the vicinity of one's own vehicle without spending long processing time. On the other hand, when the selection means select the second image processing means, the part of road images obtained by the image pickup means are processed without sampling image data and narrow-range images are processed with high resolution, enabling a monitoring with high resolution of other vehicles being far from one's own vehicle without spending long processing time. Consequently, provided is a rear-view monitor for use in vehicles, which enables monitoring over a wide range, i.e. the far and near distances, under preferable conditions.

The second aspect of the present invention is to provide the rear-veiw monitor for use in vehicles according to the first aspect of the present invention, wherein the selection means select: the first image processing means when the detection means detects other vehicle in the vicinity of one's own vehicle; the second image processing means when the detection means detects no other vehicle in the vicinity of one's own vehicle; and the first image processing means being at a low repetition rate at the time when the second image processing means is selected.

In the rear-view monitor for use in vehicles according to the second aspect of the present invention, when the detection means detect another vehicle in the vicinity of one's own vehicle, the selection means select the first image processing means so that the monitor can monitor the other vehicle in the vicinity of one's own vehicle despite monitoring with low resolution. When the detection means detect no other vehicle in the vicinity of one's own vehicle, the selection means select the second image processing means so that the monitor can monitor the other vehicle far from one's own vehicle with high resolution despite monitoring in narrow range. Furthermore, when the selection means select the second image processing means, the selection means also select the first image processing means at a low repetition rate so that the monitor can sometimes monitor the other vehicle in the vicinity of one's own vehicle despite monitoring with low resolution. Consequently, provided is a rear-view monitor for use in vehicles, which enables monitoring over a wide range, i.e. the far and near distances, under preferable conditions.

Referring to a basic assembly shown in FIG. 1B, the third aspect of the present invention is to provide a rear-view monitor for use in vehicles, comprising: vehicle-mounted image pickup means 10 for picking up images of road in the rear of one's own vehicle at every fixed time; and detection means 31-2 for detecting an overtaking vehicle by processing road images obtained by the image pickup means, wherein relative movement between one's own vehicle and the overtaking vehicle detected by the detection means is monitored, the monitor further contains blink detection means 52 for detecting blinks of winkers and an operated side thereof, the image pickup means contain a wide-angle high resolution camera, and the detection means include: first image processing means 31-21 for processing a left-hand side of road images obtained by the image pickup means; second image processing means 31-22 for processing a right-hand side of road images obtained by the image pickup means; and selection means 31-23 for selecting alternatively the first image processing means and the second image processing means and maintaining selected image processing means that correspond to a direction to which the winkers are operated when the blink detection means detects the operation of the winkers.

In the rear-view monitor for use in vehicles according to the third aspect of the present invention, the first image processing means 31-21 process the left-hand side of road images obtained by the image pickup means, and the second image processing means 31-22 process the right-hand side of road images obtained by the image pickup means, and the selection means 31-23 select alternatively the first image processing means and the second image processing means, and the blink detection means 52 maintain selected image processing means that correspond to a direction to which the winkers are operated when the blink detection means 52 detect the operation of the winkers, resulting in that the monitor can monitor another vehicle traveling near and far on adjacent lanes with high resolution without spending long processing time and can always monitor an adjacent lane into which one's own vehicle is about to enter when changing lanes. Consequently, provided is a rear-view monitor for use in vehicles, which enables monitoring of other vehicles under preferable conditions.

Referring to a basic assembly shown in FIG. 1C, the fourth aspect of the present invention is to provide a rear-view monitor for use in vehicles, comprising: vehicle-mounted image pickup means 10 for picking up road images in the rear of one's own vehicle at every fixed time; and optical flow detection means 31-3 for detecting an optical flow of another vehicle determined by successive two road images obtained at every fixed time by the image pickup means, wherein the monitor keeps monitoring relative movement between one's own vehicle and an overtaking vehicle using the optical flow detected by the optical flow detection means, the image pickup means contain a wide-angle high resolution camera, and the optical flow detection means include: first image processing means 31-31 for processing the whole successive two road images obtained at every fixed time by the image pickup means by sampling image data; second image processing means 31-32 for processing a part of road images obtained by the image pickup means without sampling image data; and selection means 31-33 for selecting either the first image processing means or the second image processing means in response to a situation of traffic.

In the rear-view monitor for use in vehicles according to the fourth aspect of the present invention, the optical flow detection means 31-3 detect an optical flow of another vehicle based on successive two road images obtained at every fixed time by the image pickup means, and the monitor keeps monitoring of relative movement between one's own vehicle and the other overtaking vehicle using the optical flow detected by the optical flow detection means.

The first image processing means 31-31 process the whole successive two road images obtained at every fixed time by the image pickup means by sampling image data, and the second image processing means 31-32 process a part of road images obtained by the image pickup means without sampling image data, and the selection means 31-33 select either the first image processing means or the second image processing means in response to a situation of traffic, resulting in that the monitor can monitor other vehicles being in the vicinity of one's own vehicle in wide range and can monitor other vehicles being far from one's own vehicle with high resolution without spending long processing time, by using optical flows of other vehicles, even if the image pickup means contain a wide-angle high resolution camera. Consequently, provided is a rear-view monitor for use in vehicles, which enables monitoring of other vehicles under preferable conditions, without bringing inconvenience accompanied by emptying a wide-angle high resolution camera.

BRIEF DESCRIPTION OF THE DRAWINGS

FIG. 3 illustrates an example of an image plane in a video camera.

FIG. 4 is a flow chart illustrating an outline of an action in a rear-view monitor for use in vehicles according to the present invention.

DESCRIPTION OF THE PREFERRED EMBODIMENTS

In the following, the preferred embodiments of the present invention are explained with reference to the attached drawings.

Figure 1A:
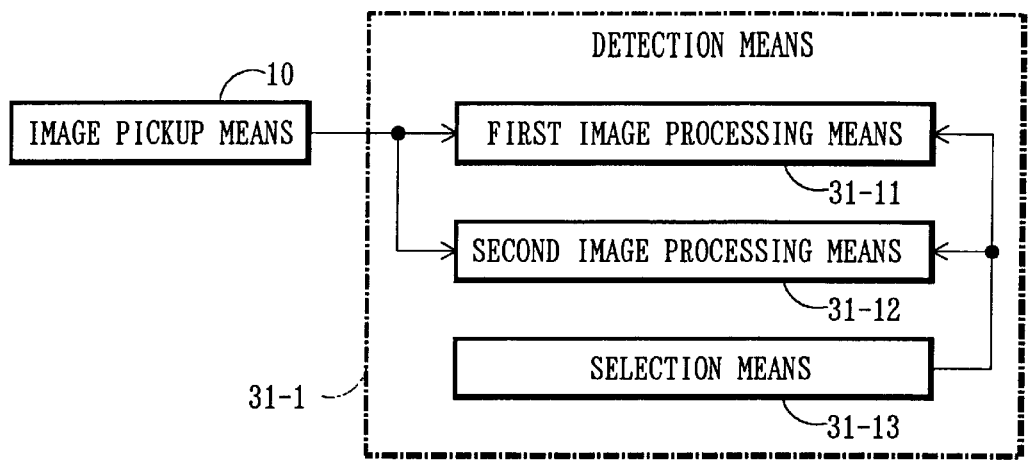
FIGS. 1A, 1B and 1C are basic assemblies of a rear-view monitor for use in vehicles according to the present invention.
Figure 1B:
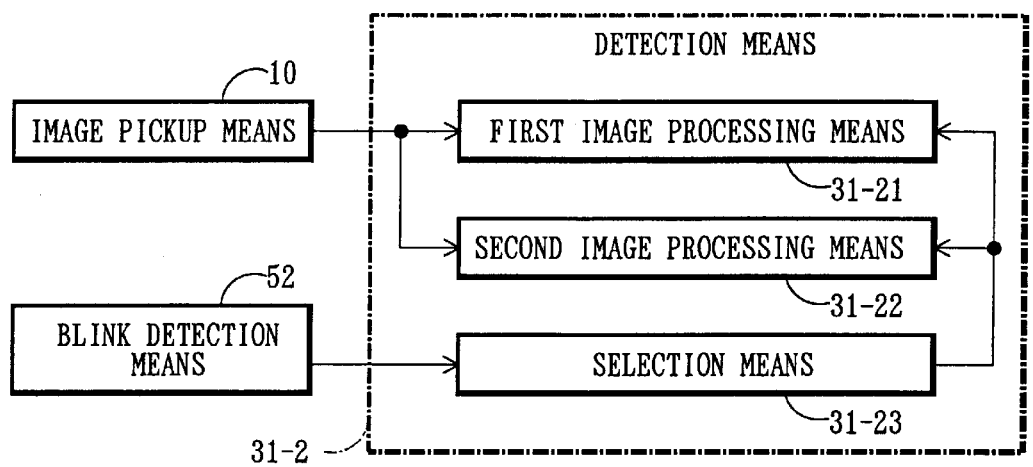
Figure 1C:
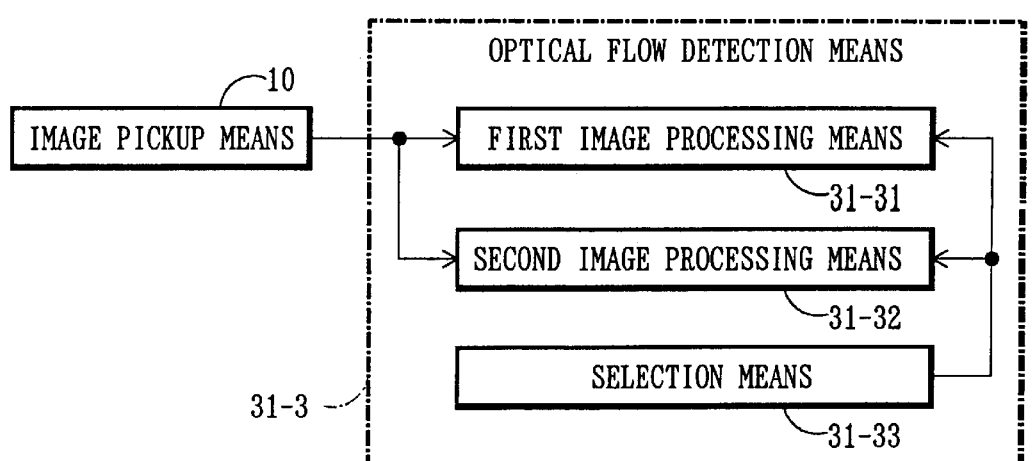
Figure 2:
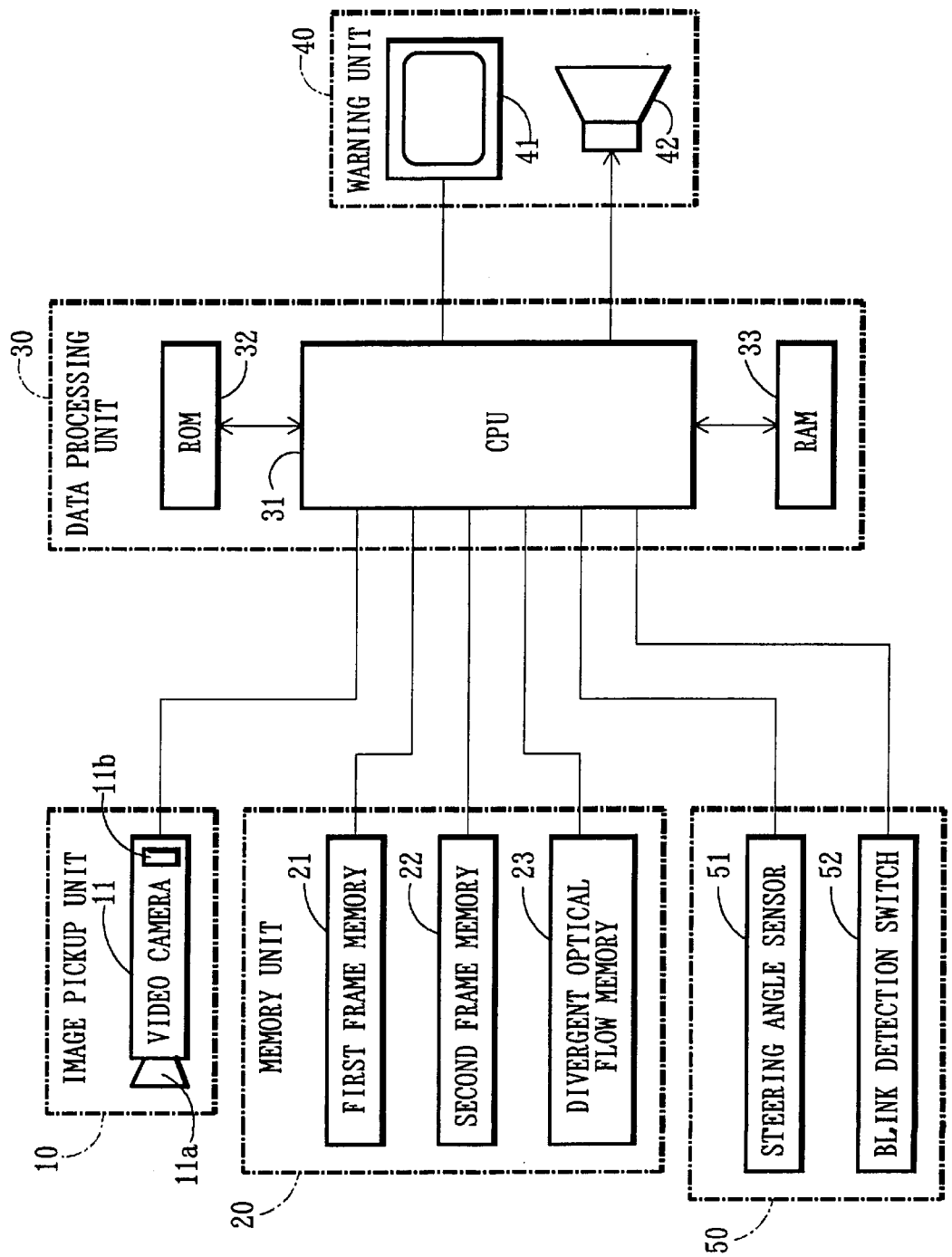
FIG. 2 is a block diagram illustrating an assembly of an optical flow-type rear-view monitor for use in vehicles according to the present invention.

FIG. 2 is a block diagram illustrating an assembly of an optical flow-type rear-view monitor for use in vehicles according to the present invention, in which the assembly comprises an image pickup unit 10 as image pickup means, a memory unit 20 for storing of image data and the like from the image pickup unit 10, a data processing unit 30 for performing image processing and monitor processing for relative movement between one's own vehicle and other vehicles based on image data obtained by the image pickup unit 10, a warning unit 40 as warning means giving a warning, and a signal input unit 50 for inputting of signal indicating operational data upon changing a traveling direction of one's own vehicle.

The image pickup unit 10 contains a video camera 11 that contains a wide-angle lens 11a having an angle of view of 120 degrees, a high resolution image plane 11b having pixels as many as 1024×1024, for example, as shown in FIG.3, and a so-called CMOS camera, which accesses randomly to any pixel on the image plane 11b to read them in. Differently from a charge-transfer type, in which charges stored in pixel corresponding to an incident light are sequentially sent and picked out, the CMOS camera is constructed as a X-Y address type so that a pixel storing charges can be selected by a horizontal line (X) and a vertical line (Y). By constructing each scanning circuit, which selects a position along a corresponding line, so as to be a circuit that can randomly accesses using a multi-plexus, a pixel can be arbitrarily selected and stored charges therein can be picked out.

The video camera 11 of the image pickup unit 10 is mounted on either a trunk lid at the rear side of a vehicle or a rear end of a vehicle. The video camera 11 is arranged to take road images in the rear of one's own vehicle and outputs image data into CPU 31 (described later) of the data processing unit 30.

The memory unit 20 comprises a first frame memory 21 storing road image data from the image pickup unit 10, the second frame memory 22, and a divergent optical flow memory 23 storing an optical flow in divergent direction.

The first frame memory 21 and the second frame memory 22 are constructed as a matrix-like memory consisting of a matrix m×n, for example, a 512- by 512-pixel matrix 512× 512. As shown in FIG.3, when a wide-angle lens is used, pixel data by sampling image data are written by reading from every other pixel on the image plane 11b, and when a zoom lens is used, pixel data corresponding to a part of a whole image are written by reading from pixels in a pixel matrix 512×512 in the vicinity of a FOE point.

The data processing unit 30 comprises CPU 31 as a central processing unit operating according to an operation program, ROM 32 for storing the operation program for the CPU 31 and predetermined values, and RAM 33 for temporarily storing data that are necessary upon carring out an operation by the CPU 31.

The warning unit 40 comprises an indicator 41 and a speaker 42. The indicator 41, consisting of a liquid crystal display (LCD) and the like, displays images taken by the video camera 11, and warns a driver of danger by an image with indicating a message when the data processing unit 30 (the CPU 31) judges a danger of contact with other vehicle. The speaker 42 gives a sound such as sound guidance or warning sound. When the data processing unit 30 judges a danger of contact with another vehicle existing, the speaker 42 warns a driver of the danger by the sound.

The signal input unit 50 comprises a steering angle sensor 51 as a steering angle detection means for detecting a steering angle or an operative steering angle for a steering wheel (normally, front wheel) of vehicle and a blink (turn signal) detection switch 52 as a blink detection means for detecting an operational state of a winkers mechanism by a driver and a direction thereof, in which the steering angle sensor 51 detects a turning data of vehicle and the blink detection swith 52 detects a turning indication data from the winkers mechanism operated by a driver when the driver turns the vehicle to left or right.

Now, a control operation by the data processing unit 30 is explained with reference to the attached flow chart.

In the control operation, an image taking process is performed in a step S110 in a major flow chart shown in FIG.

Figure 5:
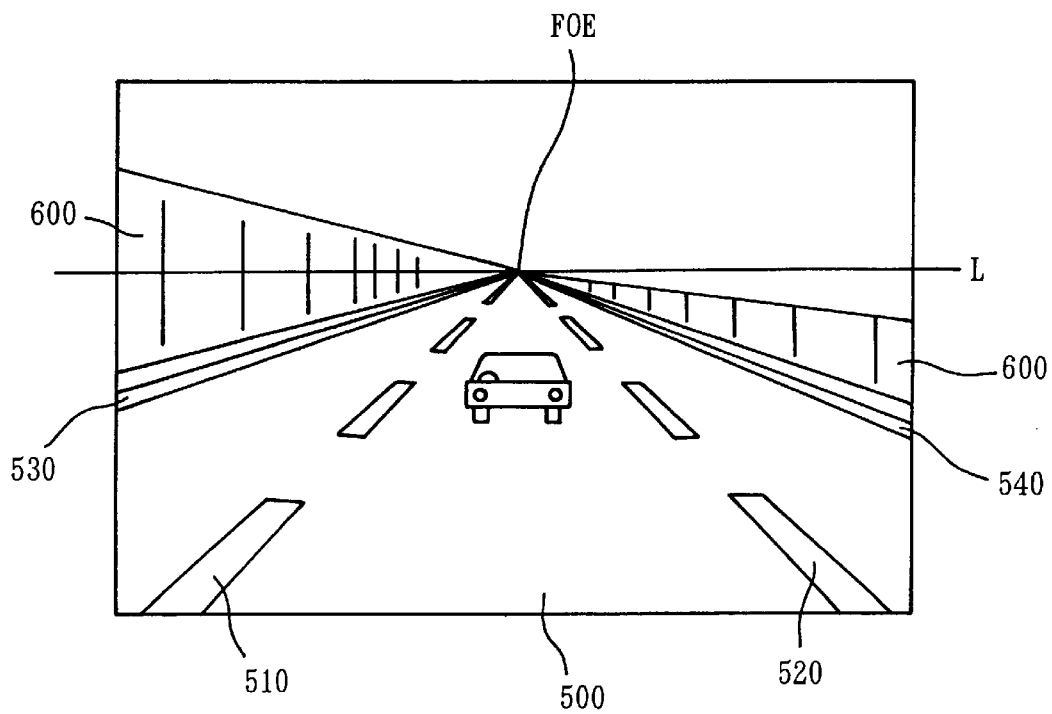
FIG. 5 illustrates an example of a road image taken by a video camera in a rear-view monitor for use in vehicles according to the present invention.
Figure 10:
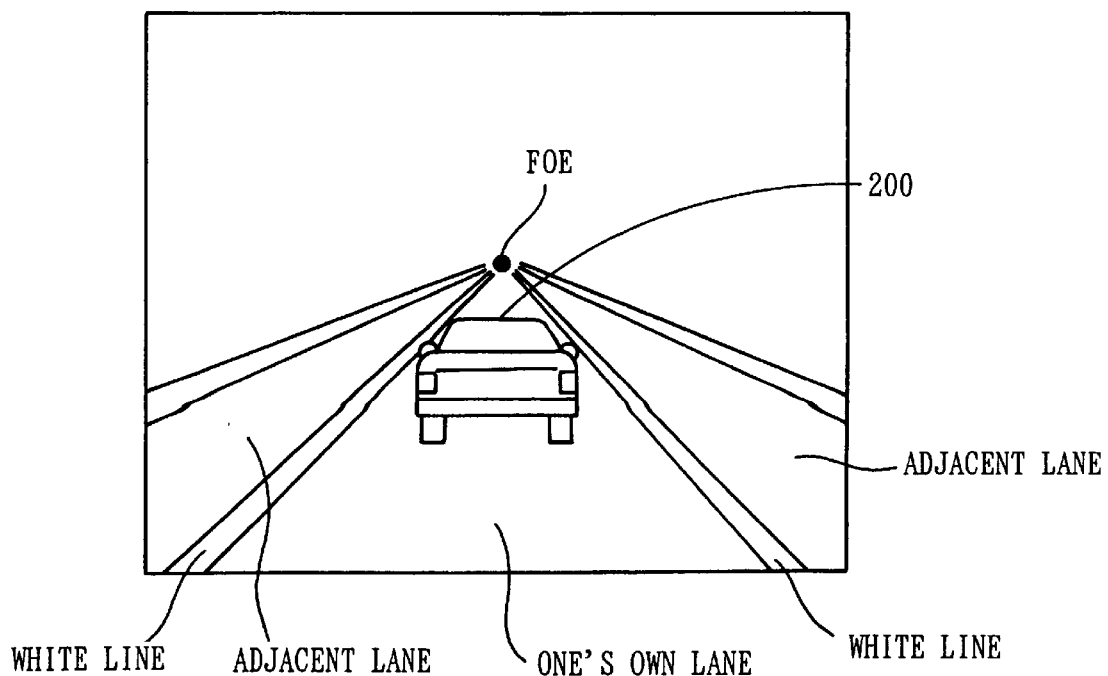
FIG. 10 is a conceptual illustration of an image of straight six-lane expressway.

4. The image taking process at the step S110 gives a rear road image, for example, as shown in FIG. 5. At an initial stage, the video camera 11 is set up in a wide-angle mode and data from every other pixel can be read out.

The road image shown in FIG. 5 is an example of an image taken from one s own vehicle traveling an exclusive road for a vehicle such as expressway and is an image of the rear road since taken by a video camera 11 that is mounted at the rear of a vehicle. The road image includes: a road 500; white lines 510 and 520 drawn on the road 500 as broken lines, which section the road to one's lane and adjacent lanes and indicates changing lane to be possible; white lines 530 and 540 drawn on the road 500 as solid lines, which section side roads and indicates changing lane to be impossible; and walls 600 set up at both sides of the road 500. All of the above elements in the image vanish at a FOE point located at a center horizontally and at one-third position vertically in the image. Road image data thus taken are stored in the first frame memory 21 of the memory unit 20.

Since road images are taken by the video camera mounted at the rear of vehicle facing backward, the right in the road image corresponds to the left from the viewpoint of traveling direction and the left in the road image corresponds to the right from the viewpoint of traveling direction. Hereinafter, the following description is done on the basis of the road image regarding definition of right and left.

Then, an optical flow detection process is performed in a step S120 in the flow chart shown in FIG. 4. Operating according to a predetermined program, the CPU 31 functions as the optical flow detection means 31-3 that detects optical flows arisen from other vehicles in monitoring range, which is set based on successive two road images obtained at every fixed time by the video camera 10. In the optical flow detection process, an optical flow is detected as a vector formed by connecting two mutually corresponded points, one of which is a point in a road image taken at a time t and stored in the first frame memory 21, and another of which is the corresponding point in a road image taken at a time t+Δt and stored in the second frame memory 22. Among thus detected optical flows, optical flows of divergent direction, i.e. divergent optical flows arising from other vehicles approaching to one's own vehicle, are stored in a divergent optical flow memory 23.

Figure 6:
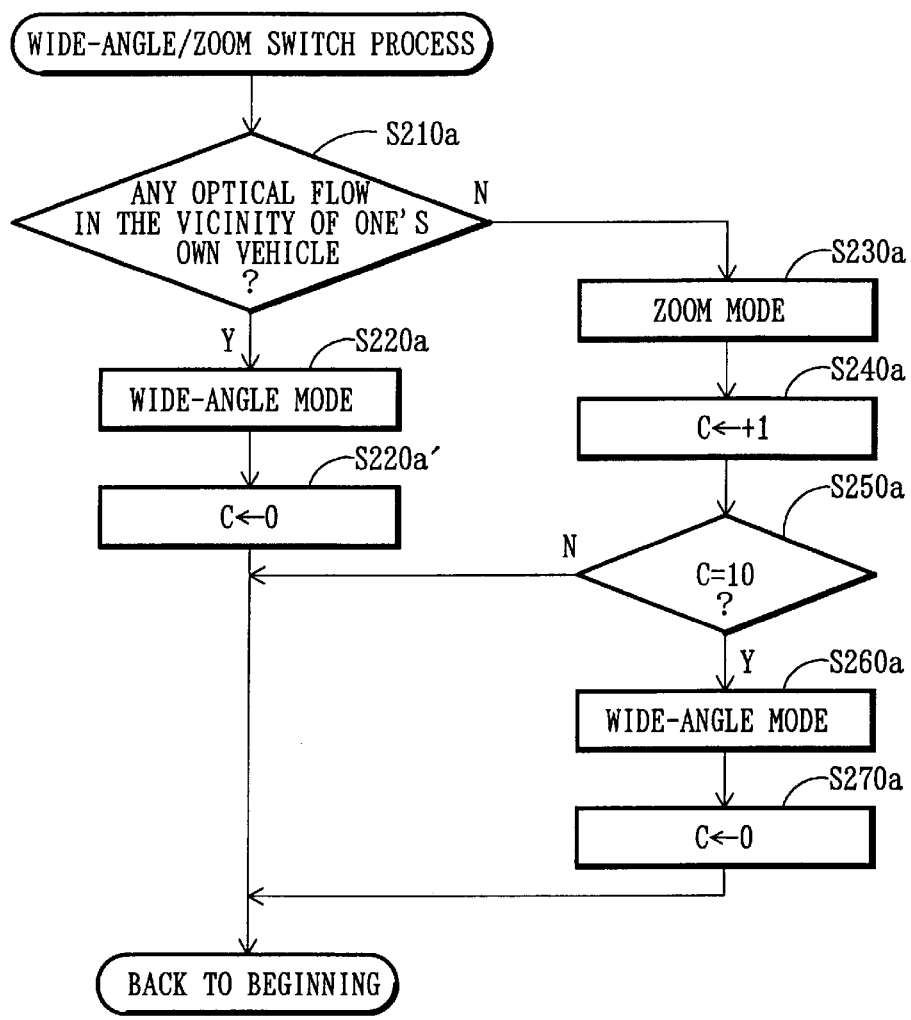
FIG. 6 is a flowchart illustrating an example of switching process between wide-angle and zooms modes.
Figure 7:
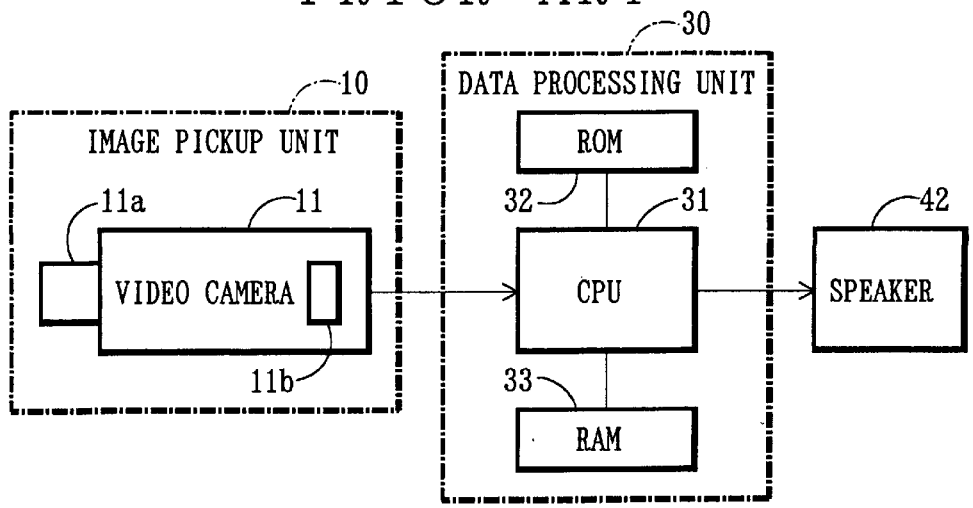
FIG. 7 is a block diagram illustrating an assembly of a conventional rear-view monitoring and warning system for vehicles.
Figure 8A:
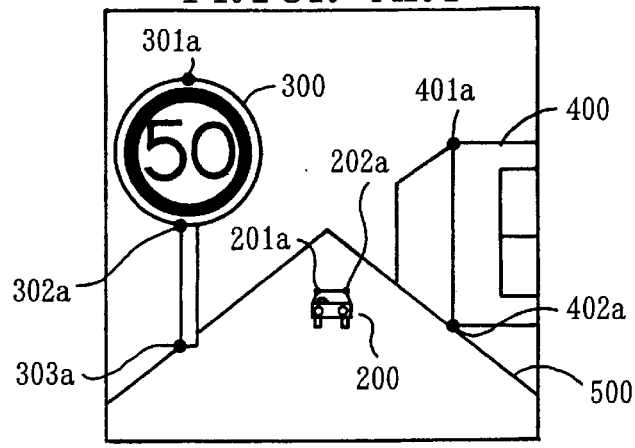
FIGS. 8A, 8B and 8C illustrate a change in an image of the rear road taken by a video camera.
Figure 8B:
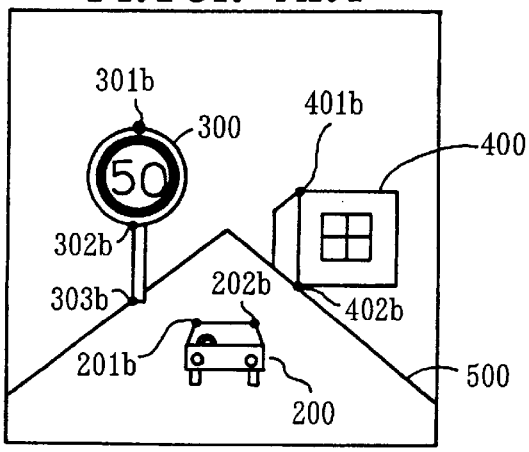
Figure 8C:
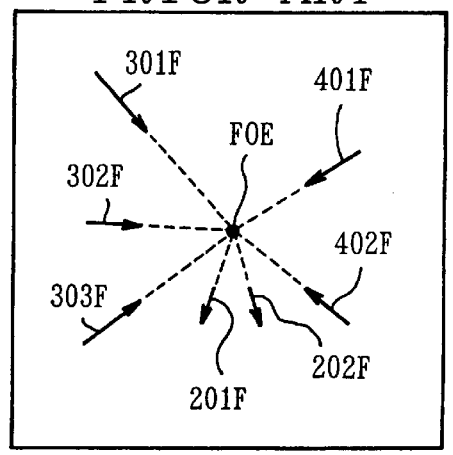
Figure 9:
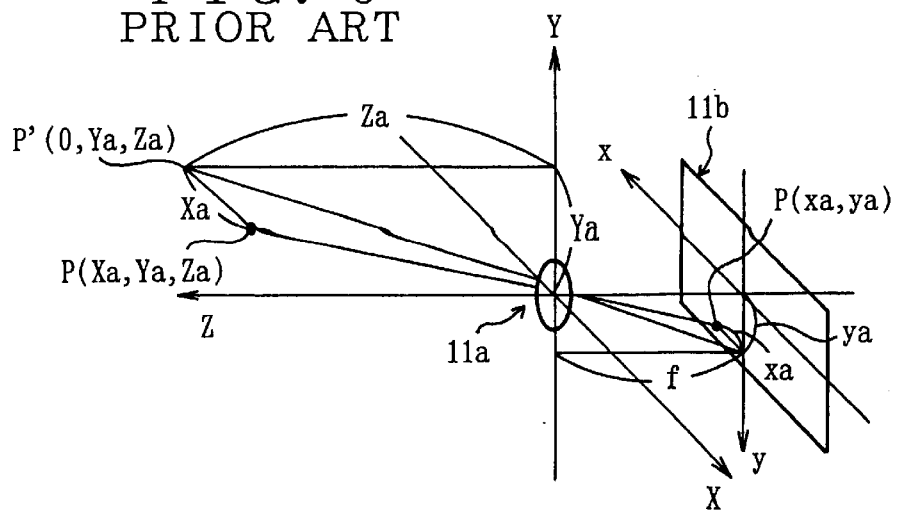
FIG. 9 illustrates an optical arrangement of the image pickup unit 10.

A wide-angle/zoom switch process is a next step S130 shown in FIG. 4 and is performed according to a flow chart shown in FIG. 6. At the beginning, in a step S210a, a judgement is made whether an optical flow in the vicinity of one's own vehicle is stored or not in the divergent optical flow memory 23. When an optical flow in the vicinity of one's own vehicle is stored, a wide-angle mode is set up in a step S220a and then, a counter C is cleared in a step S220a', and the process goes back to the beginning. On the other hand, based on the judgement in a step S210a, when an optical flow in the vicinity of one's own vehicle is not stored, a zoom mode is set up in a step S230a. Then, the counter C increases in a step S240a and then, a judgement is made whether the counter C becomes 10 or not in a step S250a. When the counter C becomes 10, a wide-angle mode is set up in a step S260a and then, a counter C is cleared in a step S270a, and the process goes back to the beginning.

According to the above processes, the CPU31 of the data processing unit 30 functions as: the optical flow detection means 31-3 for detecting an optical flow of other vehicle determined by successive two road images taken at every fixed time by the video camera 11 of the image pickup unit 10; the first image processing means 31-31 for processing the whole successive two road images taken at every fixed time by the video camera 11 of the image pickup unit 10 by sampling image data; the second image processing means 31-32 for processing a part of road images taken by the video camera 11 of the image pickup unit 10 without sampling image data; and the selection means 31-33 for selecting either the first image processing means or the second image processing means in response to a situation of traffic.

As shown in the flow chart in FIG. 6, when a zoom mode is set up, a wide-angle mode is set up once in every ten steps even if an optical flow in the vicinity of one's own vehicle is not stored, so that a sudden approach of another vehicle to one's own vehicle can be checked, while the sudden approach cannot be checked in the zoom mode. In this case, successive two road images are obtained in one step of wide-angle mode to meet with the requirement of optical flow detection.

A step S140 shown in FIG. 4 is a computing process of degree of the danger. In the step S140, among optical flows obtained in the step S130, a mesurement of optical flow size is performed with respect to optical flows of divergent direction such as aforementioned optical flows 201F and 202F. In the computing process, levels for the degree of danger may be computed by setting up several threshold levels.

In a step S150, based on the computed degree of danger in the step S140, a judgment of being in danger is made when the degree of danger exceeds a threshold value. If levels for the degree of danger are given, a judgment of being in danger is made when the level for the degree of danger becomes a specified value or higher.

When a judgment of being in danger is made in the step S150, a warning process is performed in a following step S160. On the other hand, when a judgment of not being in danger is made in the step S150, a series of a process is finished and a process beginning with the step S110 is started again as shown in FIG. 4.

In the warning process in the step S160, a sound signal is sent out to the speaker 42 of the warning unit 40 to make the speaker 42 give a sound such as sound guidance or warning sound, thereby drawing a driver's attention and warning of a danger to the driver with indicating a message and the like through the indicator 41. When the warning process in the step S160 is finished, a series a process is finished and a process beginning with the step S110 is started again.

In the aforementioned preferred embodiment, a wide-angle mode and zoom mode are changed alternatively depending upon whether an optical flow exists in the vicinity of one's own vehicle or not. Differently from this, regardless of existence or non-existence of an optical flow in the vicinity of one's own vehicle, the far and near distances may always be monitored by constantly changing a wide-angle mode and a zoom mode alternatively, and a detection of optical flows may be performed by using an alternate set of successive wide-angle image and zoom image.

In addition, such a monitoring may be possible that right and left areas alternatively are always monitored using a zoom mode and an area, into which a driver is about to change lanes and enter, is fixed to be monitored according to an operation of the blink detection switch 52. Also, such a monitoring may be possible that a wide-angle mode is always used for monitoring and an area, into which a driver is about to change lanes and enter, is monitored using zoom mode according to an operation of the blink detection switch 52.

According to the above processes, the CPU31 of the data processing unit 30 functions as: the detection means 31-2 for detecting other overtaking vehicle by processing road images obtained by the video camera 11 of the image pickup unit 10; the first image processing means 31-21 for processing a left-hand side of road images obtained by the image pickup means; the second image processing means 31-22 for processing a right-hand side of road images obtained by the video camera 11 of the image pickup unit 10; and the selection means 31-23 that select alternatively the first image processing means and the second image processing means and maintain selected image processing means that correspond to a direction to which the winkers are operated when the blink detection switch 52 detects the operation of the winkers.

In the above-preferred embodiment, shown is an example for using a video camera that can access randomly to any pixel on the image plane 11b so as to deal with without increasing memory capacity. Differently from this, when a third frame memory having large memory capacity can be prepared besides the first frame memory 21 and the second frame memory 22, images taken by the high resolution video camera 11 may tentatively be read into the third frame memory and then, data as a pixel unit may be randomly accessed from the third frame memory so as to proceed a process accordingly.

At any rate, in both modes of a wide-angle and a zoom, the image processing does not require a long time since number of pixels to be processed is not large, resulting in that the detection process of optical flows can be finished during taking of successive two road images, even if a high speed data processing unit is not prepared.

In the above-preferred embodiment, other vehicles are monitored by detecting optical flows thereof. Differently from this, according to the present invention, any other image processing that does not use optical flows can be employed to a system for monitoring of other vehicles. In such a case, the CPU31 of the data processing unit 30, which performs an image processing, functions as: the detection means 31-1 for detecting other overtaking vehicle by processing road images obtained by the video camera 11 of the image pickup unit 10; the first image processing means 31-11 for processing the whole road images obtained by the video camera 11 of the image pickup unit 10 by sampling image data; the second image processing means 31-12 for processing a part of road images obtained by the video camera 11 of the image pickup unit 10 without sampling image data; and the selection means 31-13 for selecting either the first image processing means or the second image processing means in response to a situation of traffic.

What is claimed is:

1. A rear-view monitor for use in vehicles, comprising:

vehicle-mounted image pickup means for picking up images of a road in the rear of one's own vehicle at every fixed time; and detection means for detecting an overtaking vehicle by processing road images obtained by the image pickup means, wherein relative movement between one's own vehicle and the overtaking vehicle detected by the detection means is monitored, the image pickup means contain a wide-angle high resolution camera, and the detection means include:

first image processing means for processing the whole road images obtained by the image pickup means by sampling image data;

second image processing means for processing a part of road images obtained by the image pickup means without sampling image data; and selection means for selecting either the first image processing means or the second image processing means in response to a situation of traffic.

2. The rear-view monitor for use in vehicles according to claim 1, wherein the selection means select:

the first image processing means when the detection means detects another vehicle in the vicinity of one's own vehicle:

the second image processing means when the detection means detects no other vehicle in the vicinity of one's own vehicle; and the first image processing means being at a low repetition rate at the time when the second image processing means is being selected.

3. A rear-view monitor for use in vehicles, comprising:

vehicle-mounted image pickup means for picking up images of a road in the rear of one's own vehicle at every fixed time; and optical flow detection means for detecting an optical flow of another vehicle determined by successive two road images obtained at every fixed time by the image pickup means, wherein the monitor keeps monitoring relative movement between one's own vehicle and an overtaking vehicle using the optical flow detected by the optical flow detection means, the image pickup means contain a wide-angle high resolution camera, and the optical flow detection means include:

first image processing means for processing the whole successive two road images obtained at every fixed time by the image pickup means by sampling image data;

second image processing means for processing a part of road images obtained by the image pickup means without sampling image data; and selection means for selecting either the first image processing means or the second image processing means in response to a situation of traffic.

* * * * *